Aug. 17, 1943.  H. C. JENKS  2,327,268
ELECTRIC DISCHARGE APPARATUS
Filed Aug. 11, 1939  4 Sheets-Sheet 1

WITNESSES:
E. A. McCloskey
Hyman Diamond

INVENTOR
Harold C. Jenks.
BY F. W. Lyle,
ATTORNEY

Aug. 17, 1943.   H. C. JENKS   2,327,268
ELECTRIC DISCHARGE APPARATUS
Filed Aug. 11, 1939   4 Sheets-Sheet 2

WITNESSES:
E. A. McCloskey.
Hyman Diamond

INVENTOR
Harold C. Jenks.
BY
F. W. Lyle.
ATTORNEY

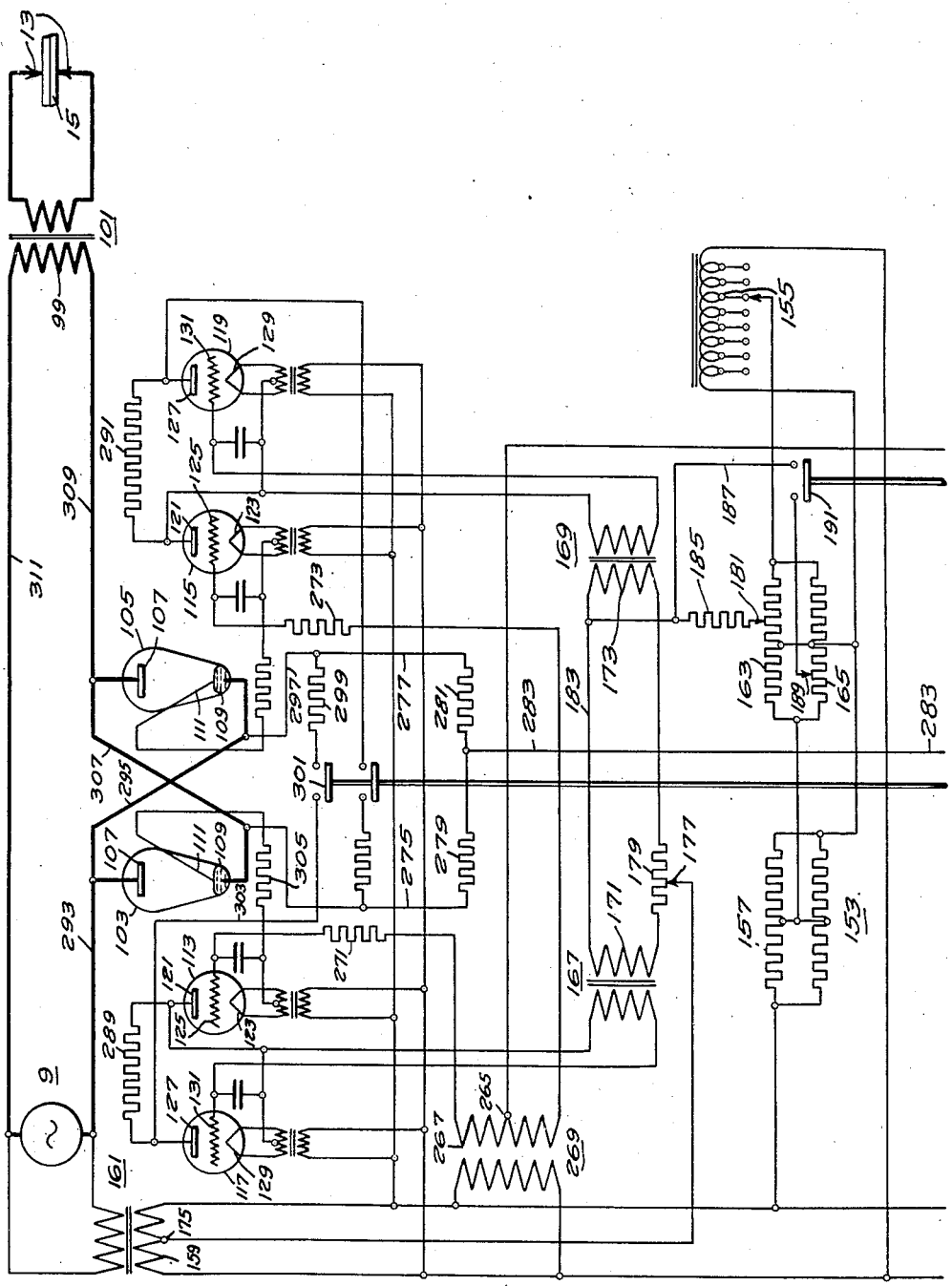

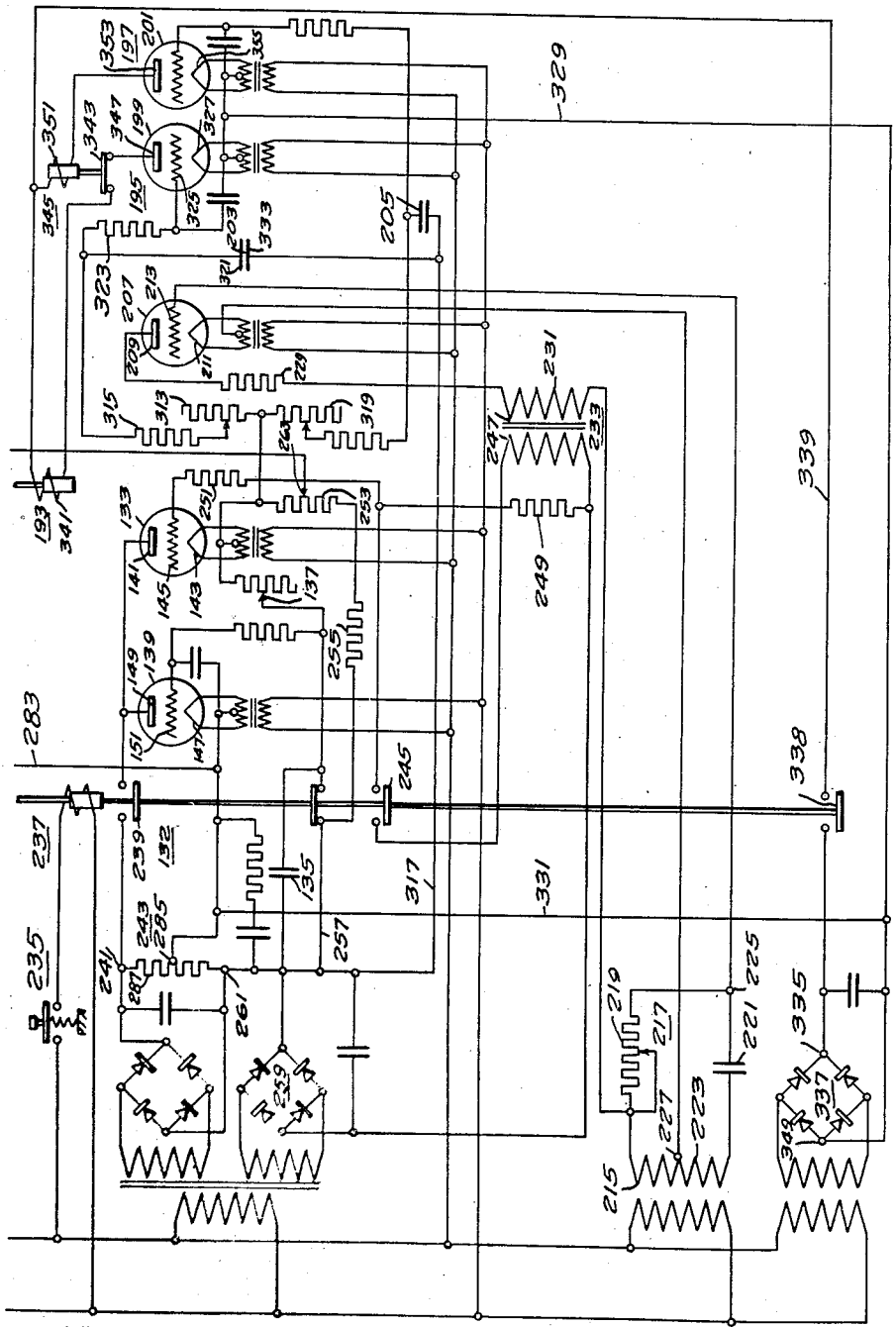

Patented Aug. 17, 1943

2,327,268

UNITED STATES PATENT OFFICE 2,327,268

ELECTRIC DISCHARGE APPARATUS

Harold C. Jenks, Wilkinsburg, Pa., assignor to Westinghouse Electric & Manufacturing Company, East Pittsburgh, Pa., a corporation of Pennsylvania Application August 11, 1939, Serial No. 289,557

8 Claims. (Cl. 219—4)

My invention relates to electric discharge systems and has particular relation to welding apparatus.

In resistance spot and seam welding, it is often desirable to heat the material to be welded just before the fusing current is applied and to anneal the weld just after the material has been fused. Welding apparatus incorporating preheating or annealing functions constructed in accordance with the teachings of the prior art is, in general, relatively complicated. The principal difficulty arises from the fact that to produce a satisfactory weld the time during which welding current flows should in general be measured out precisely. The attainment of this desideratum results in a relatively involved system and the additional requirements of reduced current flow for additional time periods before and after, the flow of the actual welding current adds to its complexity.

It is, accordingly, an object of my invention to provide a welding arrangement of simple structure with which it shall be possible to heat the material to be welded before the actual welding current is supplied or to anneal the fused material after the welding current has been supplied.

Another object of my invention is to provide welding apparatus of simple structure with which it shall be possible to satisfactorily anneal a weld.

A further object of my invention is to provide welding apparatus of simple and tractable structure with which it shall be possible to preheat the material to be welded immediately before it is fused and anneal the weld immediately after it has been produced.

More generally stated, it is an object of my invention to provide an arrangement of simple structure for supplying power from a source to a load of the type that requires current in contiguous trains of impulses of precisely predetermined length but of different amplitude.

According to my invention, I provide a welding arrangement which is energized from an alternating current source and which operates to supply welding current during discrete half cycles of the source. The flow of current through the material to be welded is initiated at instants in the half periods of the source that occur substantially earlier than the normal current zero for the power factor of the particular load involved. When the flow of actual welding current initiated in this manner is interrupted, the welding transformer remains magnetized and the reduced current flow produced by reason of the decay of flux in the transformer is used for annealing purposes. The magnitude of the residual current may be varied by premagnetizing the core of the welding transformer to any desired extent.

In the preferred practice of my invention, the residual current is used for annealing purposes. It is apparent, however, that the current may also be used for preheating purposes. In such a case, the welding current for any weld is supplied immediately after the residual current has ceased to flow and the material to be welded is advanced to a position to receive the residual current which flows by reason of the just preceding magnetization of the transformer. This object may, of course, be accomplished by properly synchronizing the supply of welding current with the movement of the material to be welded in engagement with the welding electrodes.

In accordance with another aspect of my invention, I provide an arrangement in which the usual electric discharge valves are interposed between an alternating current source and the material to be welded. The valves are rendered conductive by potential supplied through a phase shift network. The latter incorporates a pair of voltage dividers which determine the instants in the half periods of the source when the energizing potentials are supplied through the network. One of the voltage dividers is set to render the valves conductive at instants in the half periods of the source corresponding to annealing and preheating current and the other is set for welding current. The former voltage divider is coupled to the valve means for predetermined intervals of time before and after the interval during which the welding current flows. The other is coupled to the valve means during the welding current interval.

The novel features that I consider characteristic of my invention are set forth with particularity in the apended claims. The invention itself, however, both as to its organization and its method of operation, together with additional objects and advantages thereof, will best be understood from the following description of specific embodiments when read in connection with the accompanying drawings, in which:

Figure 5:
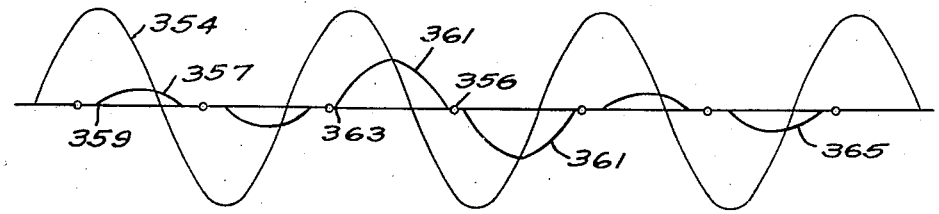

Figs. 3 and 4 together constitute a diagrammatic view showing a modification of my invention, and Fig. 5 is a graph illustrating the operation of the modification shown in Figs. 3 and 4.

Figure 1:
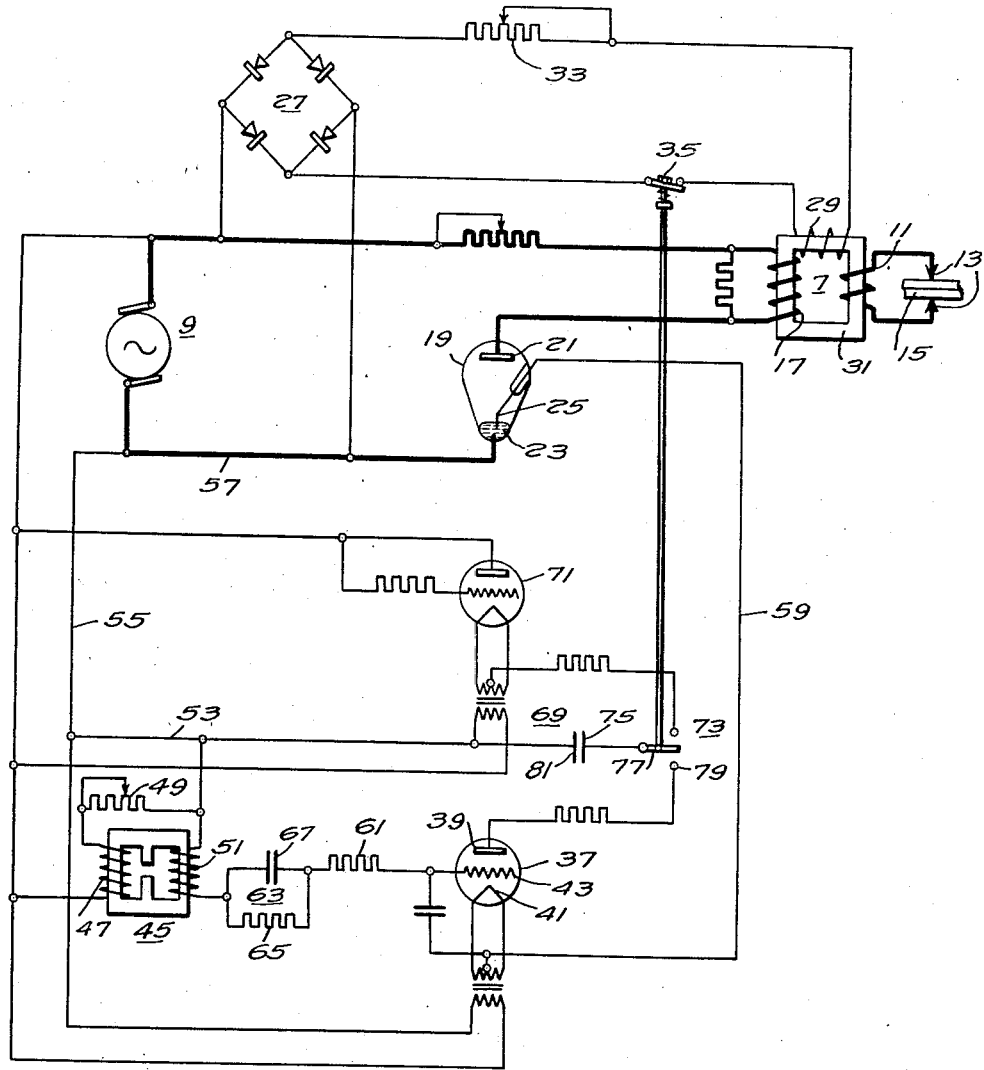
Figure 1 is a diagrammatic view showing a preferred embodiment of my invention.

The apparatus shown in Fig. 1 is a modification of the half wave welder shown and described in a copending application Serial No. 206,643, filed May 7, 1938, to J. W. Dawson and assigned to the assignee of the present application. It comprises a welding transformer 7 supplied from source 9 of alternating current, which may be of the usual commercial 60 cycle type. The secondary 11 of the transformer 7 is connected across a pair of welding electrodes 13 which engage the material 15 to be welded. The primary 17 of the transformer 7 is supplied from the source 9 through an ignitron tube 19. The latter comprises an anode 21, a mercury pool cathode 23 and an ignition electrode 25. The transformer 7 is supplied with premagnetizing current from a rectifier 27, which is connected across an auxiliary winding 29 on the core 31 through an adjusting rheostat 33 and an interrupting switch 35.

The polarity of the direct current supplied to the auxiliary winding 29 should in general be the same as the polarity of the current supplied through the ignitron 19. However, under certain circumstances, the premagnetizing current may be of the opposite polarity and in the preferred practice of my invention the premagnetizing current supply circuit 27, 33 incorporates a reversing switch and a voltage divider with a center tap so that current of either polarity may be supplied to the auxiliary winding 29. The effect of premagnetizing current of the same polarity as that supplied through the ignitron 19 is to increase the magnetization of the core beyond that produced by the current flow through the ignitron and thus to increase the residual current produced by the decay of the flux. Current of the opposite polarity, of course, has the converse effect.

The ignitron 19 is controlled from an auxiliary electric discharge valve 37 of the hot cathode gaseous type. The latter is provided with an anode 39, a cathode 41 and a control electrode 43. Control potential is supplied to the auxiliary valve 37 from a peaking transformer 45, the primary 47 of which is connected across the source 9 through a rheostat 49 which functions to determine the phase of the peaks supplied by the transformer relative to the potential of the source.

The secondary 51 of the peaking transformer 45 is connected between the control electrode 43 and the cathode 41 of the auxiliary valve 37 through the cathode 23 and the ignition electrode 25 on the ignitron 19. The secondary circuit of the peaking transformer 45 thus extends from the upper terminal of the winding 51 through a conductor 53, a conductor 55, a conductor 57, the cathode 23 and the ignition electrode 25 of the ignitron 19, a conductor 59, the cathode 41 of the auxiliary valve 37, the control electrode 43 of the auxiliary valve, a resistor 61, a network 63 consisting of a resistor 65 shunted by a capacitor 67 to the lower terminal of the winding 51. Anode potential is supplied to the auxiliary valve 37 from a capacitor 69 which is charged from the main source 9 through a rectifier 71 just prior to the initiation of a welding operation.

To produce a weld, the electrodes 13 are engaged with the material 15 and a starting circuit controller 73 which may be a push button or a foot switch is operated in one sense. By this operation, the capacitor 69 is connected to the rectifier 71 and charged. After this, the controller is operated in the opposite sense and the capacitor 69 is now disconnected from the rectifier and connected to the anode 39 of the auxiliary valve 37. The controller 73 is coupled to the switch 35 in such manner that the operation in the first sense does not affect the switch but the operation in the latter sense opens the switch disconnecting the rectifier 27 from the auxiliary winding 29.

At an instant predetermined by the setting of the rheostat 49 in the primary circuit of the peaking transformer 45, the auxiliary valve 37 is rendered conductive and the capacitor 69 is discharged in a circuit extending from its right-hand plate 75 through the contacts 77 and 79 of the controller 73, the anode 39 and cathode 41 of the auxiliary valve 37, the conductor 59, the ignition electrode 25 and cathode 23 of the ignitron valve 19, the conductor 57, the conductor 55, the conductor 53 to the left-hand plate 81 of the capacitor. The ignitron is now rendered conductive and current flows through the welding transformer 7 and the material 15 to be welded.

The rheostat 49 in series with the primary 47 of the peaking transformer 45 is so set that the current flow through the ignitron 19 is initiated at an instant substantially earlier in the half period the source than the instant of normal current zero. When the current flow through the ignitron 19 is interrupted, the welding transformer 7 is magnetized and residual current flows by reason of the decay of the flux in the transformer core 31 and generates heat for anealing the weld.

In addition to the current produced by reason of the decay of the magnetization arising from the current flow through the ignitron 19, there is also current flow by reason of the premagnetization. The latter may be adjusted at will by properly setting the magnitude of the direct current which is supplied through the auxiliary winding 29. By properly adjusting the premagnetization, the magnitude of the annealing current may be set at the most propitious value.

Figure 2:
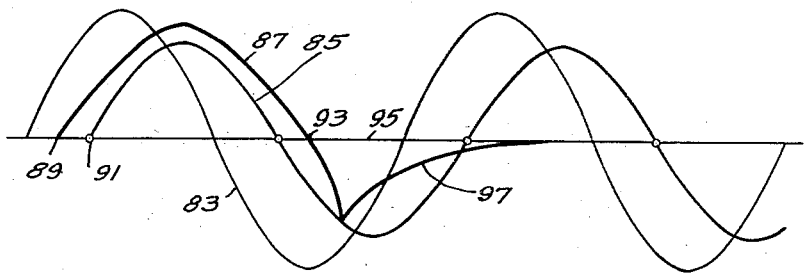
Fig. 2 is a graph illustrating the operation of Fig. 1.

The operation of the apparatus shown in Fig. 1 is illustrated in Fig. 2. In the latter view, current and potential are plotted vertically and time horizontally. The light lined sine wave 83 represents the potential supplied from the source 9. The medium sine wave 85 represents the steady state current which would flow through the welding load were it permanently connected to the source 9. The phase lag indicated between the potential and the current corresponds to the power factor of the load. The heavy curve 87 indicates the actual current flow through the material to be welded. It is to be noted that the current is initiated at a point 89 substantially earlier in the half cycle than the point 91 at which the normal current zero occurs. At the point 93 where the heavy curve 87 cuts the abscissa 95, the current flow through the valve 19 ceases. However, because the welding transformer 7 is magnetized, current flow through the material 15 to be welded continues in the opposite sense as indicated by the cusped curve 97 below the axis 95. The magnitude of the latter current flow may be varied by varying the premagnetization of the core 31. If the annealing current is to be larger than is available by reason of the flux arising from the current flow through the main valve 19 alone, as is usually the case, the premagnetization is in the same sense as the current flow through the valve. If the annealing current is to be smaller than that available by reason of the flux arising from the main valve current, the premagnetization may be in the opposite sense to the magnetization produced by the valve current.

In the apparatus shown in Figs. 3 and 4, current is supplied to the primary 99 of a welding transformer 101 from the source 9 through a pair of ignitrons 103 and 105 connected in antiparallel. Each of the ignitrons has an anode 107, a cathode 109 and an ignition electrode 111. Ignition current is supplied to the ignitrons 103 and 105 through timing valves 113 and 115 respectively, and heat control valves 117 and 119 respectively; a timing valve and a heat control valve being connected in series with the ignition electrode and the cathode of each of the ignitrons. The timing valves 113 and 115 each comprise an anode 121, a hot cathode 123 and a control electrode 125 and are preferably of the arc-like discharge type. The heat control valves are also of the arc-like type and each comprises an anode 127, a hot cathode 129 and a control electrode 131.

The conductivity of the timing valves 113 and 115 is controlled in the usual manner from a timing system 132 incorporating a start valve 133, which supplies current to charge a timing capacity 135 through a rheostat 137, and a stop valve 139 which renders the start valve 133 non-conductive when the capacitor 135 attains a predetermined charge. The start valve 133 is of the arc-like discharge type and comprises an anode 141, a hot cathode 143 and a control electrode 145. The stop valve 139 is also of the arc-like type and in addition to a hot cathode 147 comprises an anode 149 and a control electrode 151.

The conductivity of the heat control valves 117 and 119 is controlled from a phase shift network 153 of the usual structure comprising a reactor 155 and a resistor 157 connected in series with each other across the secondary 159 of an auxiliary transformer 161 supplied from the source 9. Between the reactor 155 and the resistor 157 a pair of parallel connected voltage dividers 163 and 165 are interposed. The ignition impulses are applied between the control electrodes 131 and the cathodes 129 of the heat control valves 117 and 119 through a pair of control transformers 167 and 169, the primaries 171 and 173 of which are supplied with potential from the phase shift network 153. The intermediate tap 175 of the secondary 159 of the auxiliary transformer 161 is connected to the adjustable tap 177 of a resistor 179 interconnecting the lower terminals of the primaries 171 and 173. The adjustable tap 181 of one of the voltage dividers 163 is connected to the conductor 183 connecting the upper terminals of the primaries 171 and 173 of the control transformers 167 and 169 through a resistor 185. The resistor 185 may be short circuited by a conductor 187 extending from the adjustable tap 189 of the other voltage divider 165 when the normally open movable contactor 191 of a relay 193 controlled from the timing system 132 is energized.

The former voltage divider 163 is set so that the potential supplied through it renders the heat control valves 117 and 119 conductive at instants late in the half periods of the source corresponding to the preheating and annealing current desired. In practice, the heat control and annealing current may be the same if a proper magnitude suitable for both purposes is selected. The other voltage divider 165 is set so that the heat control valves 117 and 119 are rendered conductive at instants early in the half periods of the source corresponding to the welding current required. The connection of the voltage dividers 163 and 165 in the control circuit to the heat control valves is controlled from a pair of auxiliary timing systems 195 and 197, each of which incorporates a valve 199 and 201 respectively controlled from a timing capacitor 203 and 205 respectively in its control circuit.

To control the start valve 133, a control valve 207 of the arc-like type comprising an anode 209, a hot cathode 211 and a control electrode 213 is provided. The control valve is supplied with anode-cathode potential from a transformer 215 energized from the main source 9. A phase shift network 217 comprising a variable resistor 219 and a capacitor 221 is connected across the secondary 223 of the transformer. The control electrode 213 of the valve 207 is connected to the junction point 225 of the variable resistor 219 and capacitor 221 and the cathode 211 to the intermediate tap 227 of the secondary. The anode 209 of the control valve 207 is connected through a current limiting resistor 229 and the primary 231 of a control transformer 233 to the upper terminal of the secondary 223 of the supply transformer. After the main switch (not shown) for the plant is closed the control valve 207 is rendered conductive during alternate half cycles at instants in the half periods which are determined by the setting of the phase shift network 217.

To initiate a welding operation, a circuit controller 235 such as a foot switch or a push button, is closed and a starting relay 237 is energized. An intermediate contactor 239 of the relay 237 closes and connects the anodes 141 and 149 of the start and stop valves 133 and 139 respectively to the positive terminal 241 of a direct current supply source 243. At the same time another contactor 245 closes and connects the secondary 247 of the control transformer 233 across a resistor 249 in the control circuit of the start valve 133. When the control valve 207 is next rendered conductive, a potential impulse is induced in the secondary 247 of the control transformer 233 and potential is supplied to the control electrode 145 of the start valve 133 in a circuit which extends from the upper terminal of the resistor 249 now connected through the movable contactor 245 to the secondary 247 of the control transformer 233, through a grid resistor 251 to the control electrode 145 of the start valve 133, the cathode 143 of the start valve, a rheostat 253, a resistor 255, a conductor 257, a biasing source 259 to the lower terminal of the resistor. The potential thus impressed in the control circuit renders the start valve 133 conductive, current is supplied in a circuit extending from the positive terminal 241 of the rectifier 243 through the movable contactor 239 of the starting relay 237, the anode 141 and the cathode 143 of the valve 133, the rheostat 137, the timing capacitor 135 to the negative terminal 261 of the rectifier 243, and the timing capacitor 135 is charged. Current is also supplied through the start valve 133 to a voltage divider 253 which is connected between the cathode 143 of the start valve and the negative terminal 261 of the rectifier 243.

The adjustable tap 263 of the latter voltage divider 253 is connected to the intermediate tap 265 of the secondary 267 of a transformer 269, the terminal taps of which are connected to the control electrodes 125 of the timing valves 113 and 115 through suitable grid resistors 271 and 273. The cathodes 123 of the timing valves 113 and 115 are connected through the ignition electrodes 111 and the cathodes 109 of the associated ignitrons 103 and 105, corresponding conductors 275 and 277 and resistors 279 and 281 and a common conductor 283 to an intermediate tap 285 of a voltage divider 287 interconnecting the terminals 241 and 261 of the rectifier 243. Since the voltage divider 253 in series with the start valve 133 is connected to the negative terminal 261 of the rectifier 243, the circuit between the control electrodes 125 and the cathodes 123 of the timing valves 113 and 115 is thus closed. Therefore, when current is supplied through the latter voltage divider 253, the timing valves 113 and 115 are at once rendered conductive. The corresponding heat control valves 117 and 119 are initially non-conductive and current flows through each of the timing valves 113 and 115 in circuits including resistors 289 and 291, respectively, which shunt the corresponding heat control valves 117 and 119. The resistors 289 and 291 are so large that the current supplied in the ignition circuits of the corresponding ignitrons 103 and 105 is insufficient to render the ignitrons conductive. For the left-hand ignitron 103 the circuit extends from the lower terminal of the main source 9 through a line conductor 293, a conductor 295, a conductor 297, a resistor 299, the upper movable contactor 301 of the starting relay 237, a conductor 303, the shunting resistor 289, the anode 121 and the cathode 123 of the corresponding timing valve 113, a resistor 305, the ignition electrode 111 and the cathode 109 of the ignitron 103, a conductor 307, a conductor 309, the primary 99 of the welding transformer 101, a line conductor 311 to the upper terminal of the source 9. The circuit for the other ignitron is similar.

The heat control valves 117 and 119 are at first supplied with potential from the voltage divider 163 the variable tap 181 of which is connected to the control transformers 167 and 169 through the resistor 185. Therefore, at an instant predetermined by the setting of the voltage divider 163, the heat control valves are rendered conductive and short circuit their associated shunting resistors 289 and 291, respectively. Sufficient current is now transmitted through the ignitron electrodes 111 and cathodes 109 of the corresponding ignitrons 103 and 105 and the latter are each in its turn rendered conductive at instants in the half periods of the source corresponding to the setting of the voltage divider 163, and supply current to the material 15. The voltage divider 163 is so set that the current supplied is too small for welding purposes but sufficient to preheat the material to be welded.

The timing capacitors 203 and 205 of the two auxiliary timing circuits 195 and 197 are each connected in circuit with the voltage divider 253 in series with the start valve 133. The circuit for one of the capacitors 203 extends from the upper terminal of the voltage divider 253 through a rheostat 313, a resistor 315, the capacitor 203, a conductor 317 to the negative terminal 261 of the direct-current supply 243 which is, in turn, connected to the lower terminal of the voltage divider 253. The other circuit extends from the upper terminal of the voltage divider through a second rheostat 319, the other capacitor 205, the conductor 317 to the negative terminal 261 of the direct-current supply. The capacitors 203 and 205 are, therefore, charged at a rate predetermined by their associated rheostats 313 and 319, respectively.

The potentials supplied by the two capacitors are impressed in the control circuits of the corresponding auxiliary timing valves 199 and 201. The circuit for the first capacitor 203 extends from its upper plate 321 through a grid resistor 323, the control electrode 325 of the corresponding timing valve 199, the cathode 327 of the valve, a conductor 329, a conductor 331, the intermediate tap 285 of the voltage divider 287 energized from the direct-current supply 243, the lower portion of the voltage divider to the lower plate 333 of the capacitor 203. The other capacitor 205 is similarly connected to its corresponding valve 201.

The rate of charging of the two capacitors is such that the valve 199 associated with the first capacitor 203 is rendered conductive at an instant corresponding to the time at which the preheating interval is to terminate. Current then flows in a circuit extending from the positive terminal 335 of the direct-current supply 337 provided for the auxiliary timing valves 199 and 201 through closed contactor 338 of the starting relay 237, a conductor 339, the exciting coil 341 of the relay 193 controlling the connection of the heat control voltage dividers 163 and 165, the movable contactor 343 of a relay 345 controlled from the other auxiliary timing valve 201, the anode 347 and the cathode 327 of the first timing valve 199, the conductor 329 to the negative terminal 349 of the direct current supply. The relay 193 controlling the voltage dividers 163 and 165 is energized and the voltage divider 165 replaces the other divider 163 in the primary circuits of the control transformers 167 and 169. The heat control valves 117 and 119 are now rendered conductive at instants in the half periods predetermined by the setting of the voltage divider 165. The latter is so set that the resultant current supplied to the material 15 is sufficient for welding.

After the welding current has been transmitted for a predetermined number of half periods, the timing capacitor 205 in the auxiliary timing circuit 197 acquires sufficient positive potential to render the associated valve 201 conductive. Current now flows in a circuit extending from the positive terminal 335 of the rectifier 337 through the contactor 338, the conductor 339, the exciting coil 351 of the relay 345 which maintains the circuit of the other auxiliary timing valve 199 closed, the anode 353 and cathode 355 of the auxiliary timing valve 201, the conductor 329 to the negative terminal 349.

The relay 345 is now energized and opens the anode circuit of the other auxiliary timing valve 199 causing the relay 193 controlling the connection of the voltage dividers 163 and 165 to be deenergized. The welding voltage divider 165 is now disconnected from the control circuits of the heat control valves 117 and 119 and the other voltage divider 163 again becomes effective. The current which now flows through the material 15 is the same as the preheating current and the setting of the voltage divider is such that this current is sufficient for annealing purposes.

The annealing current continues to flow until the timing capacitor 135 in series with the start tube 133 becomes charged to a predetermined potential. The latter capacitor is connected between the control electrode 151 and the cathode 147 of the stop valve 149 and when it attains the present potential, the stop valve 149 is rendered conductive and reduces the anode-cathode potential across the start valve 131 to such an extent that the latter becomes non-conductive. Current flow through the voltage divider 253 in circuit with the start valve now ceases and, therefore, the corresponding timing valves 113 and 115 in the ignition circuits of the ignitrons 103 and 105 are rendered non-conductive. Current flow through the material 15 to be welded, therefore, ceases.

The operation of the system is illustrated in Fig. 5. In this view potential and current are plotted vertically and time is plotted horizontally. The full sinusoidal curve 354 represents the source potential. The small circles 356 represent the position of the power factor angle, i. e., normal current-zero points. The first two small half waves 357 from the left represent the preheating current flow. It is to be noted that each of the half waves is initiated at an instant 359 in the corresponding half cycles substantially later than that corresponding to the power factor angle. The larger half waves 361 in the center represent the welding current. This current, it is to be noted, is initiated at instances 363 immediately following those corresponding to the power factor points 356. The two small half waves 365 on the right represent the annealing current. The latter are of the same amplitude as the preheating current half waves.

It is to be noted that in the system illustrated in Fig. 5, the preheating and annealing half waves are equal in number. Of course, this need not necessarily be the case. The length of time during which the preheating and annealing current flows is set by the rheostats 313 and 319 in series with the capacitors in the control circuits of the auxiliary timing valves 199 and 201 and assume any desired values.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. For use in supplying power for welding a material from a source of current the combination comprising reactive means having a magnetizable core interposed between said source and said material, valve means for controlling the supply of welding current through said reactive means to said material and means for rendering said valve means conductive to supply welding current to said material for an interval of time such that when current flows through said reactive means is interrupted the decay of flux in said reactive means causes the flow of sufficient current through said material to anneal it.

2. For use in supplying power for welding a material from a source of alternating current the combination comprising reactive means having a magnetizable core interposed between said source and said material, valve means permitting the flow of only a half cycle of current from said source for controlling the supply of welding current through said reactive means to said material and means for initiating the conductivity of said valve means at an instant in a half period of said source that is earlier than the normal current zero instant by a predetermined amount such that the decay of the flux in said reactive means after said valve means is rendered non-conductive causes the flow of sufficient current through said material to anneal it.

3. For use in supplying power from a source of periodically pulsating potential to a load the combination comprising valve means interposed between said source and said load, a phase shift network for supplying potential impulses to render said valve means conductive and including a first voltage divider for determining the phase of said potential impulses supplied by said network relative to the potential of said source and a second voltage divider for determining the phase of said potential impulses supplied by said network relative to the potential of said source, said dividers being set so that said network supplies potentials having different phases for each of them, means for coupling said first divider to said valve means for a predetermined interval of time thereby to initiated the conductivity of said valve means during said interval at instants in the periods of said source that correspond to the phase at which said first divider is set, and means for coupling said second divider to said valve means for another predetermined interval of time thereby to initiate the conductivity of said valve means during said other interval at instants in the periods of source that correspond to the phase at which said second divider is set.

4. For use in supplying power from a source of periodically pulsating potential to a load the combination comprising valve means interposed between said source and said load, a phase shift network for supplying potential impulses to render said valve means conductive and including a first voltage divider for determining the phase of said potential impulses supplied by said network relative to the potential of said source and a second voltage divider for determining the phase of said potential impulses supplied by said network relative to the potential of said source, said first divider being so set that the potential impulses to render said valve means conductive are supplied through it at instants late in the periods of said source and said second divider being so set that the potential impulses to render said valve means conductive are supplied through it early in the periods of said source, means for coupling said first divider to said valve means during two predetermined intervals of time separated by an intermediate interval of time thereby to initiate the conductivity of said valve means during said two intervals at instants late in the periods of said source, and means for coupling said second divider to said valve means during said intermediate interval thereby to initiate the conductivity of said valve means during said intermediate interval at instants early in the periods of said source.

5. For use in supplying power for welding a material from a source of current the combination comprising reactive means having a magnetizable core interposed between said source and said material, valve means for controlling the supply of welding current through said reactive means to said material, means for rendering said valve means conductive to supply welding current to said material for an interval of time such that when current flow through said reactive means is interrupted the decay of flux in said reactive means causes the flow of sufficient current through said material to anneal it, means for supplying direct current to said core to premagnetize said core, means for varying the magnitude of direct current to vary the magnitude of said annealing current, and means for interrupting the supply of direct current when said valve means is rendered conductive.

6. For use in supplying power from a source of periodically pulsating potential to a load, the combination comprising valve means interposed between said source and said load, a phase shift network for producing potential impulses of the same periodicity as said source potential and including a pair of voltage dividers for determining the phase of said potential impulses relative to the source potential, said dividers being set so that the phase of the potential impulses produced through the first of said dividers is different from the phase of the potential impulses produced through the second divider, and means for coupling said network to said valve means for supplying potential impulses through one of said dividers to render the valve means conductive at instants in the periods of said source corresponding to the phase of the potential impulses supplied thereto and including means for selecting the one of said dividers through which the potential impulses to render said valve means conductive are supplied.

7. For use in supplying power from a source of periodically pulsating potential to a load, the combination comprising valve means interposed between said source and said load, a phase shift network for producing potential impulses of the same periodicity as said source potential and including a pair of voltage dividers for determining the phase of said potential impulses relative to said source potential, said dividers being set so that the phase of the potential impulses produced through the first of said dividers is different from the phase of the potential impulses produced through the second divider, means for coupling said network to said valve means to supply potential impulses through the first divider for rendering the valve means conductive, and switch means for changing the coupling of said network to said valve means to supply potential impulses through the second divider for rendering the valve means conductive.

8. In combination, an electric discharge valve of the arc-like type having a pair of principal electrodes and a control member, a source of periodically pulsating potential connected across said principal electrodes, a phase shift network for producing two sets of potential impulses each having a different phase relative to said source, said network including a first voltage divider for determining the phase of the potential impulses of the first of said sets of impulses and a second voltage divider for determining the phase of the potential impulses of the second set, means for connecting said network to impress said first set of potential impulses between one of said principal electrodes and said control member to render said valve conductive at instants in the periods of said source that correspond to the phase of the potential impulses so impressed, and switch means for changing the connection of said network to impress said second set of potential impulses between said one electrode and said control member to render said valve conductive at instants in the periods of said source potential that correspond to the phase of the potential impulses of said second set.

HAROLD C. JENKS.